(12) United States Patent
Stuckey et al.

(10) Patent No.: US 9,731,558 B2
(45) Date of Patent: Aug. 15, 2017

(54) TIRE ASSEMBLY INCLUDING AN INNER TIRE AND AN OUTER TIRE

(71) Applicants: Bridgestone Americas Tire Operations, LLC, Nashville, TN (US); Firestone Industrial Products Company, LLC, Indianapolis, IN (US)

(72) Inventors: Jon I. Stuckey, Lorain, OH (US); David J. Zemla, Canal Fulton, OH (US); Jason B. Smith, Avon, IN (US); Pradipta N. Moulik, Carmel, IN (US); Michael C. Howard, Noblesville, IN (US); Jonathan D. Wood, North Canton, OH (US)

(73) Assignees: Bridgestone Americas Tire Operations, LLC, Nashville, TN (US); Firestone Industrial Products Company, LLC, Nashville, TN (US)

( * ) Notice: Subject to any disclaimer, the term of this patent is extended or adjusted under 35 U.S.C. 154(b) by 248 days.

(21) Appl. No.: 14/624,297

(22) Filed: Feb. 17, 2015

(65) Prior Publication Data
US 2015/0246583 A1 Sep. 3, 2015

Related U.S. Application Data

(60) Provisional application No. 61/946,718, filed on Mar. 1, 2014.

(51) Int. Cl.
*B60C 11/02* (2006.01)
*B60C 11/00* (2006.01)
*B60C 19/00* (2006.01)

(52) U.S. Cl.
CPC ............. *B60C 11/02* (2013.01); *B60C 11/00* (2013.01); *B60C 2019/004* (2013.04)

(58) Field of Classification Search
CPC . B60C 11/02; B60C 15/0027; B60C 15/0054; B60C 15/0063; B60C 15/0081
USPC .......................................................... 152/176
See application file for complete search history.

(56) References Cited

U.S. PATENT DOCUMENTS

| | | | | |
|---|---|---|---|---|
| 1,650,107 A | * | 11/1927 | Auger | B60C 11/02 152/173 |
| 3,942,574 A | * | 3/1976 | Bantz | B60C 15/04 152/540 |
| 5,593,522 A | | 1/1997 | Neddenriep | |
| 5,759,314 A | * | 6/1998 | Southarewsky | B60C 9/06 152/454 |
| 6,352,090 B1 | * | 3/2002 | Rayman | B60C 11/02 152/167 |
| 2006/0090558 A1 | | 5/2006 | Raskas | |
| 2006/0130952 A1 | * | 6/2006 | Sandstrom | B60C 11/02 152/537 |
| 2012/0285589 A1 | | 11/2012 | Huang | |

FOREIGN PATENT DOCUMENTS

| KR | 1020040011576 A | 2/2004 |
|---|---|---|
| KR | 1020130095871 A | 8/2013 |

OTHER PUBLICATIONS

Lee, Chang Ho; International Search Report and Written Opinion for PCT application No. PCT/US2015/016180; May 15, 2015; pp. 1-13; Korean Intellectual Property Office; Daejeon Metropolitan City, Republic of Korea.

* cited by examiner

*Primary Examiner* — Timothy Kennedy

(57) ABSTRACT

Various embodiments of a tire assembly having an inner tire and an outer tire are disclosed.

18 Claims, 9 Drawing Sheets

TIRE ASSEMBLY INCLUDING AN INNER TIRE AND AN OUTER TIRE

BACKGROUND

Tires on vehicles may be exposed to a variety of road conditions. For example, a tire may be exposed to conditions such as: dry, wet, snowy, icy, muddy, etc. Certain tread patterns, compounds, block stiffness, and other qualities of the tire's tread may be best suited for any particular condition. However, in an effort to make tires that are applicable across a variety of conditions, or seasons of the year, many tire manufacturers optimize parameters so as to make tires that perform decently in a variety of conditions.

As a result, a consumer operating a vehicle in a variety of road conditions, and/or seasonal conditions, may have to have their vehicle's tires swapped out with tires better suited for a particular condition. However, dismounting tires from a rim, and remounting other tires is not a simple task.

Additionally, tires often wear only in the tread and shoulder regions of the tire. As a result, a tire that is worn to the point that it must be replaced may still be suitable for use, with exception to its tread and shoulder regions. Some consumers opt to have tires retreaded, wherein the worn tread and shoulder regions of the tire are replaced. However, such retreading is a specialized service and not a simple task.

What is needed is a tire assembly having an easily replaceable radially outer portion.

SUMMARY

In one embodiment a tire assembly is provided, the tire assembly comprising: an inner tire having: a radially innermost surface, at least one substantially circumferential inner tire groove, at least one shoulder region, and at least one upper sidewall region, wherein at least one of the at least one shoulder region and the at least one upper sidewall region comprise at least one axial engagement portion; an outer tire having: at least one radially inwardly extending periphery engagement portion, and at least one outer tire bead; wherein the outer tire is oriented radially outwardly of the inner tire; wherein the outer tire and the inner tire contact at an interface; wherein the at least one periphery engagement portion at least substantially mates with the at least one axial engagement portion; and wherein the at least one outer tire bead mates with the at least one inner tire groove.

In another embodiment, a tire assembly is provided, the tire assembly comprising: an inner tire having a radially innermost surface and at least one substantially circumferential inner tire groove; an outer tire having at least one outer tire bead; wherein the outer tire is oriented radially outwardly of the inner tire; wherein the outer tire and the inner tire contact at an interface; and wherein the at least one outer tire bead mates with the at least one inner tire groove.

BRIEF DESCRIPTION OF THE DRAWINGS

The accompanying figures, which are incorporated in and constitute a part of the specification, illustrate various example configurations, and are used merely to illustrate various example embodiments. In the figures, like elements bear like reference numerals.

DETAILED DESCRIPTION

Figure 1:
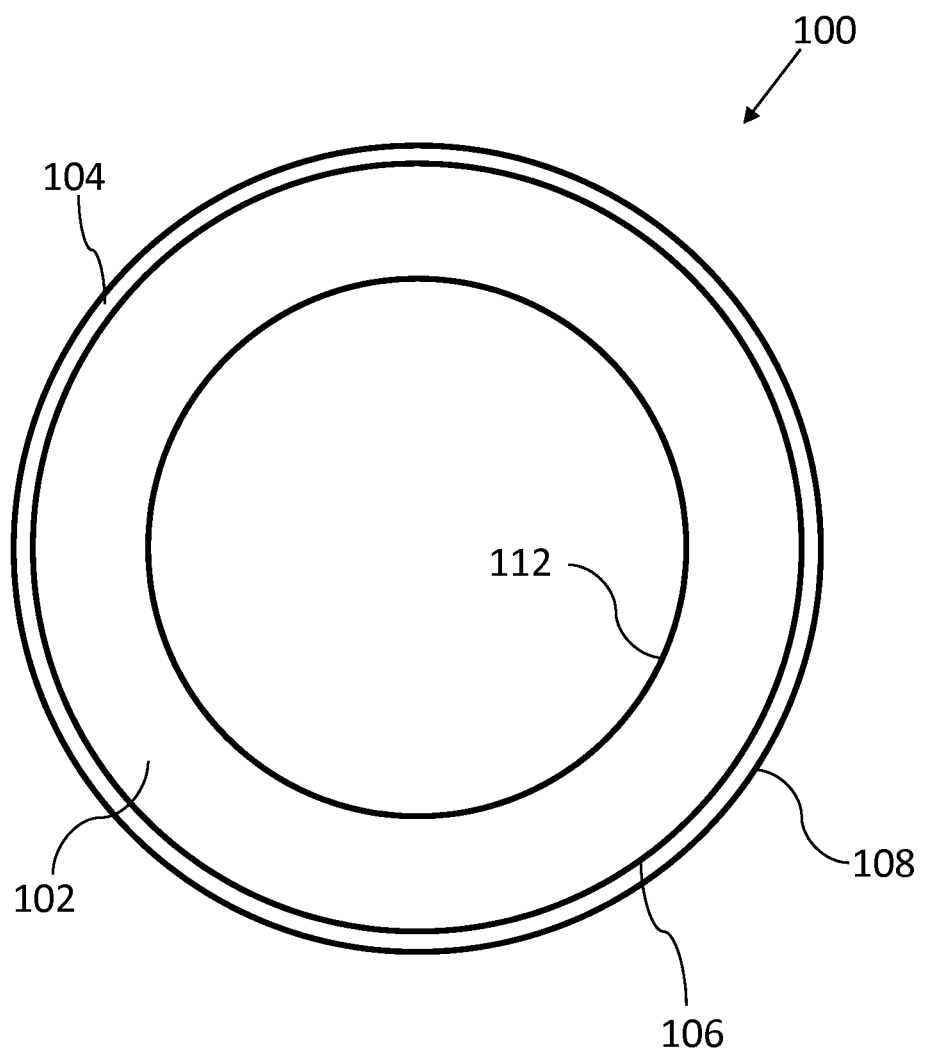
FIG. 1 illustrates a side elevational view of an example embodiment of a tire assembly including an inner tire and an outer tire.

FIG. 1 illustrates a sectional view of a tire assembly 100 including an inner tire 102 and an outer tire 104. Tire assembly 100 may include an interface 106 between inner tire 102 and outer tire 104. Tire assembly 100 may include an outer running surface 108. Tire assembly 100 may include a rim mounting portion 112.

Inner tire 102 may include any of a variety of pneumatic or non-pneumatic tires. Inner tire 102 may include a tire suited for use on a roadway or off-road. Inner tire 102 may be used for any of a variety of applications, including racing application, passenger application, light truck and sport utility vehicle application, truck and bus application, off-the-road application, agricultural application, and the like. In one embodiment, inner tire 102 may itself be configured to run on a roadway. Inner tire 102 may include a tread, including at least one rib and at least one substantially circumferentially-oriented groove. In one embodiment, inner tire 102 includes a plurality of independent tread blocks.

In one embodiment, inner tire 102 may include rubber reinforced with reinforcement materials, including for example at least one body ply, at least belt, at least one bead, and the like. Inner tire 102 may include an innerliner configured to hold air within the confines of inner tire 102. Inner tire 102 may be configured for mounting on a traditional vehicle rim. Inner tire 102 may alternatively be configured for mounting on a specialized vehicle rim.

Outer tire 104 may include running surface 108. Outer tire 104 and/or running surface 108 may include a tread pattern similar to a traditional tire. Outer tire 104 and/or running surface 108 may include a "slick" surface similar to a racing tire.

In one embodiment, outer tire 104 is a substantially solid tire, comprising a rubber. Outer tire may include a rubber reinforced with reinforcement materials, including for example at least one body ply, at least belt, at least one bead, and the like.

Inner tire 102 may include a radially outermost surface, while outer tire 104 may include a radially innermost surface, wherein the two surfaces may be configured to contact one another at interface 106. In one embodiment, interface 106 may include a rubber-on-rubber interface. Interface 106 may include a material to mitigate or reduce a wear between inner tire 102 and outer tire 104. Interface 106 may include a removable adhesive to mitigate or reduce a wear between inner tire 102 and outer tire 104. Interface 106 may include a grease or other substance to at least one of lubricate interface 106, keep moisture out of interface 106, and reduce a wear between inner tire 102 and outer tire 104.

Figure 2:
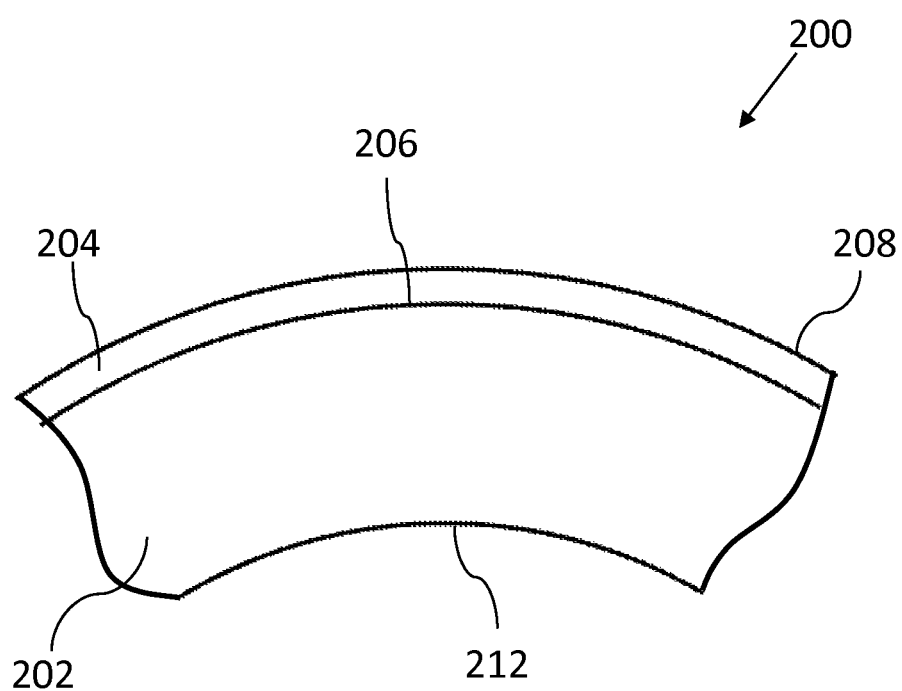
FIG. 2 illustrates a partial side elevational view of an example embodiment of a tire assembly including an inner tire and an outer tire.

FIG. 2 illustrates a partial sectional view of a tire assembly 200 including an inner tire 202 and an outer tire 204. Tire assembly 200 may include an interface 206 and a running surface 208. Tire assembly 200 may include a rim mounting portion 212.

As illustrated in FIG. 2, interface 206 may be a circumferential interface having a substantially circular profile. Inner tire 202 and outer tire 204 may include a substantially circular radially outermost surface and radially innermost surface, respectively.

Figure 3:
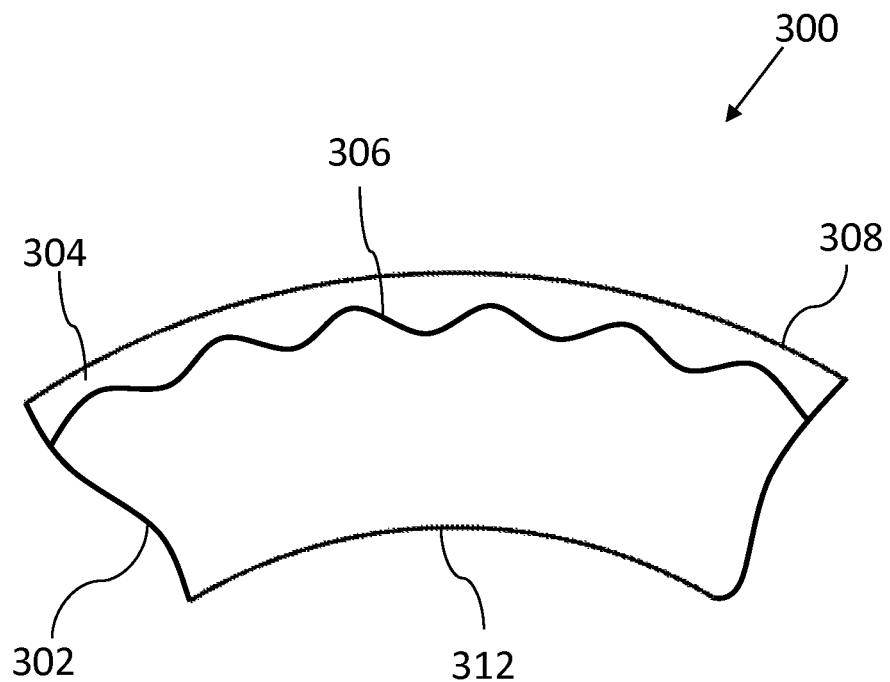
FIG. 3 illustrates a partial side elevational view of an example embodiment of a tire assembly including an inner tire and an outer tire.

FIG. 3 illustrates a partial sectional view of a tire assembly 300 including an inner tire 302 and an outer tire 304. Tire assembly 300 may include an interface 306 and a running surface 308. Tire assembly 300 may include a rim mounting portion 312.

As illustrated in FIG. 3, interface 306 may be a circumferential interface having a wavy profile. Inner tire 302 and outer tire 304 may include a wavy radially outermost surface and radially innermost surface, respectively. Interface 306 may be configured such that radially outwardly extending "peaks" on inner tire 302 at least substantially mate with radially outwardly extending "valleys" on outer tire 304. Likewise, interface 306 may be configured such that radially inwardly extending "valleys" on inner tire 302 at least substantially mate with radially inwardly extending "peaks" on outer tire 304. In this manner, interface 306 may at least partially prevent inner tire 302 and outer tire 304 from rotating relative to one another.

It is contemplated that interface 306 could include any system of positive and negative geometry on inner tire 302 and outer tire 304 that functions to prevent inner tire 302 and outer tire 304 from rotating relative to one another. In one embodiment, interface 306 includes such a system of positive and negative geometry across at least a portion of the axial width of inner tire 302 and outer tire 304. In another embodiment, interface 306 extends into at least one shoulder region of inner tire 302, and interface 306 includes such a system of positive and negative geometry in at least one shoulder region of inner tire 302. In another embodiment, interface 306 extends into at least one upper region of a sidewall of inner tire 302, and interface 306 includes such a system of positive and negative geometry in at least one upper sidewall region of inner tire 302.

In one embodiment, inner tire 302 includes at least one substantially transverse or otherwise non-circumferentially-extending groove. Interface 306 may be configured such that a positive geometry extending radially inwardly from outer tire 304 engages the negative groove of inner tire 302.

Figure 4:
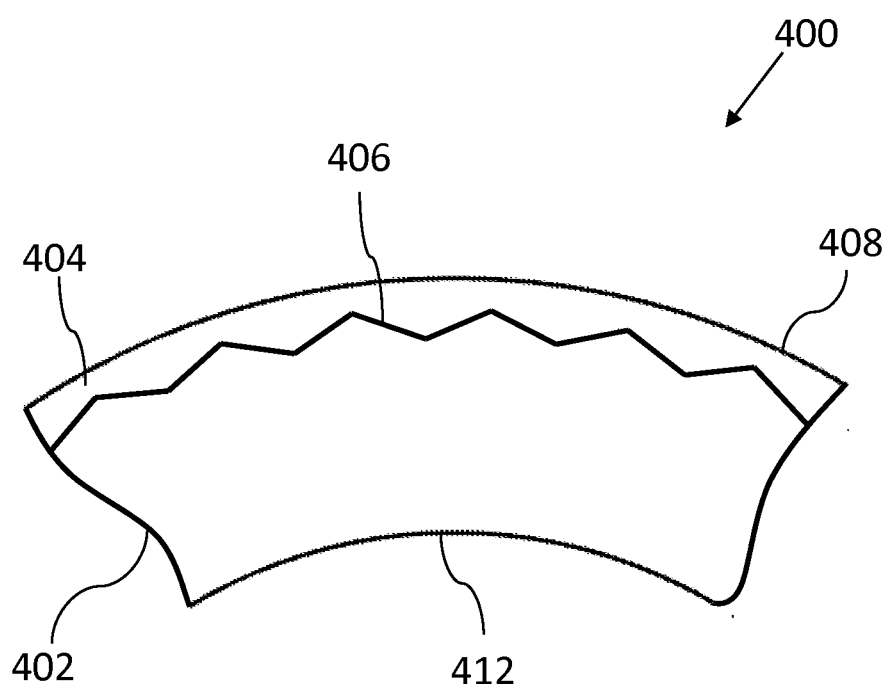
FIG. 4 illustrates a partial side elevational view of an example embodiment of a tire assembly including an inner tire and an outer tire.

FIG. 4 illustrates a partial sectional view of a tire assembly 400 including an inner tire 402 and an outer tire 404. Tire assembly 400 may include an interface 406 and a running surface 408. Tire assembly 400 may include a rim mounting portion 412.

As illustrated in FIG. 4, interface 406 may be a circumferential interface having a saw tooth profile. Inner tire 402 and outer tire 404 may include a saw tooth radially outermost surface and radially innermost surface, respectively. Interface 406 may be configured such that radially outwardly extending "peaks" on inner tire 402 at least substantially mate with radially outwardly extending "valleys" on outer tire 404 Likewise, interface 406 may be configured such that radially inwardly extending "valleys" on inner tire 402 at least substantially mate with radially inwardly extending "peaks" on outer tire 404. In this manner, interface 406 may at least partially prevent inner tire 402 and outer tire 404 from rotating relative to one another.

Figure 5:
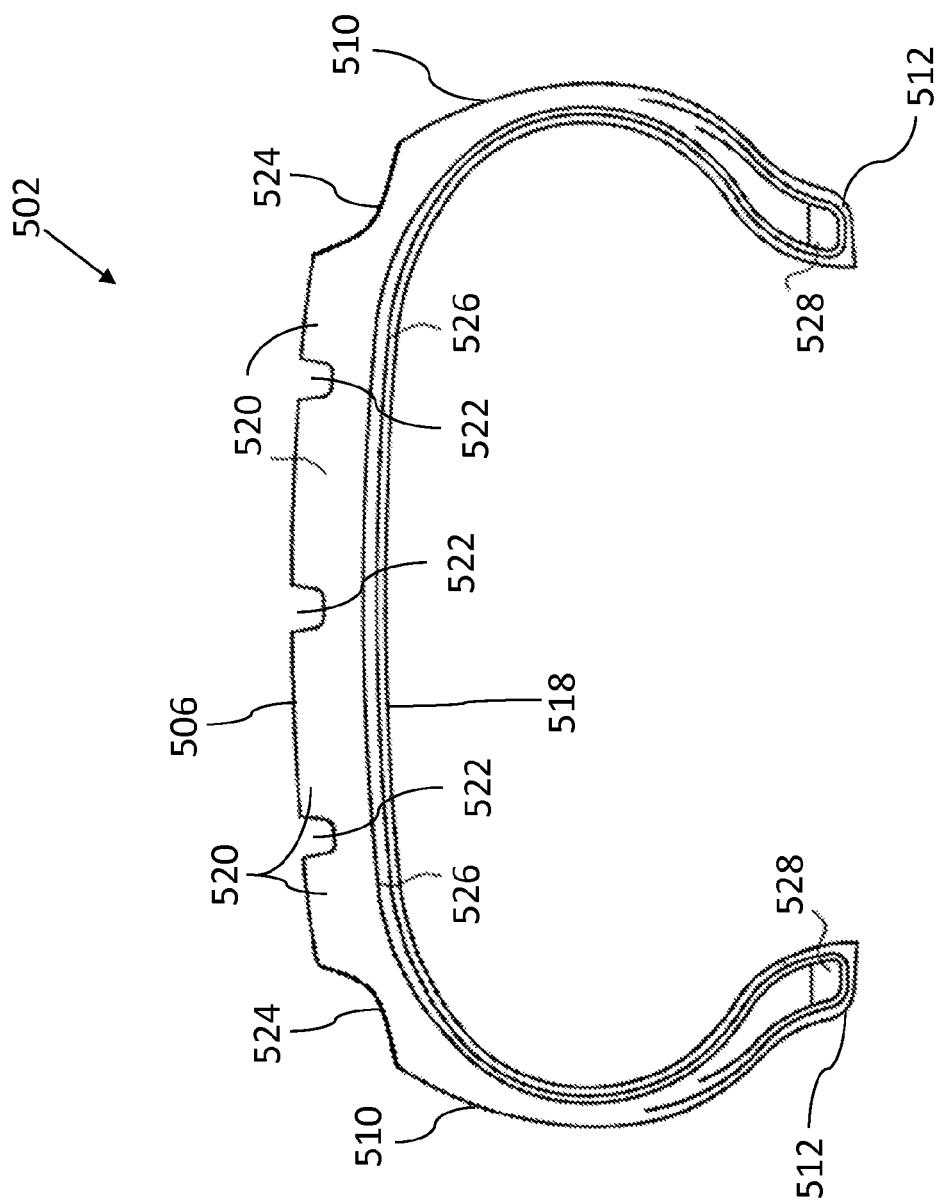
FIG. 5 illustrates a sectional view of an example embodiment of an inner tire.

FIG. 5 illustrates a sectional view of an inner tire 502. Inner tire 502 may include a surface interface 506. Inner tire 502 may include at least one sidewall 510. Inner tire 502 may include a radially innermost surface 518. Inner tire 502 may include at least one rib 520, and at least one substantially circumferential groove 522. Inner tire 502 may include at least one axial engagement portion 524.

Radially innermost surface 518 may include an innerliner configured to at least substantially prevent air from escaping the confines of inner tire 502. In one embodiment, radially innermost surface 518 may include a support element radially inwardly of, radially outwardly of, or combined with, an innerliner.

In one embodiment, inner tire 502 includes at least one rib 520 and at least one groove 522 configured to run on a road surface. At least one rib 520 and at least one groove 522 may make up a tread pattern. At least one rib 520 and at least one groove 522 may further make up tread blocks configured to run on a road surface.

In one embodiment, inner tire 502 includes a crown region having a reduced gauge as compared to standard tires for use in similar applications as inner tire 502. Alternatively, inner tire 502 may include a crown region having a similar or even greater gauge as compared to standard tires for use in similar applications as inner tire 502.

At least one axial engagement portion 524 may include a radiused portion configured to engage at least a portion of an outer tire (not shown). Axial engagement portion 524 may include a substantially circumferential groove in the shoulder region of inner tire 502. The dimensions of axial engagement portion 524 may be configured such that an outer tire (not shown) fitted to inner tire 502 does not move axially relative to inner tire 502. In one embodiment, each shoulder region of inner tire 502 includes an axial engagement portion 524. In another embodiment, each sidewall 510 of inner tire 502 includes an axial engagement portion 524. In another embodiment, an upper sidewall portion of sidewall 510 includes an axial engagement portion 524.

Inner tire 502 may include reinforcement including at least one body ply 526 and at least one bead 528. Inner tire 502 may additionally include at least one belt (not shown).

Figure 6:
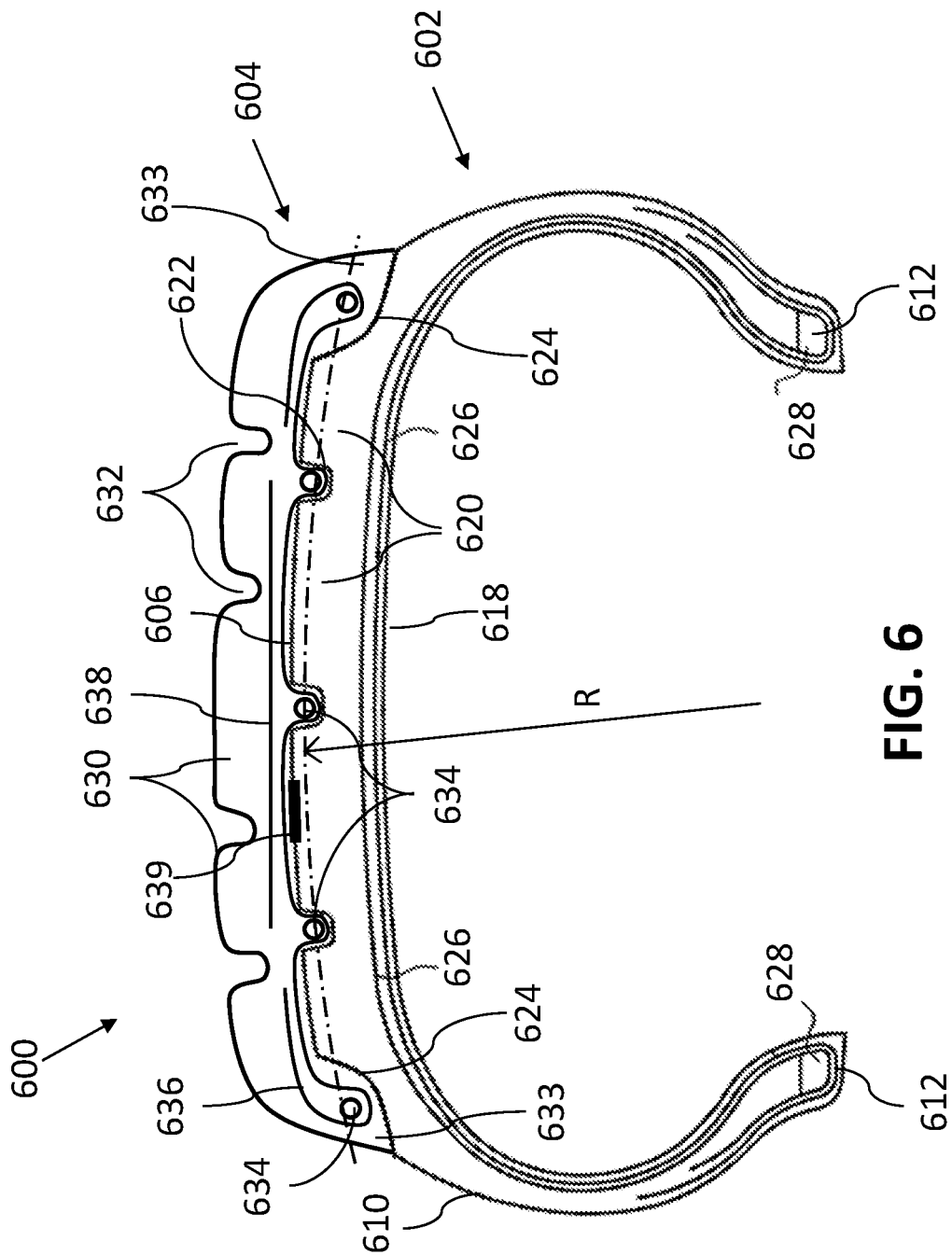
FIG. 6 illustrates a sectional view of an example embodiment of a tire assembly including an inner tire and an outer tire.

FIG. 6 illustrates a sectional view of a tire assembly 600 including an inner tire 602 and an outer tire 604. Tire assembly 600 may include an interface 606.

Inner tire 602 may include at least one sidewall 610. Inner tire 602 may include a radially innermost surface 618. Inner tire 602 may include at least one inner tire rib 620, and at least one substantially circumferential inner tire groove 622. Inner tire 602 may include at least one axial engagement portion 624. Inner tire 602 may include reinforcement including at least one body ply 626 and at least one bead 628. Inner tire 602 may additionally include at least one belt (not shown).

Outer tire 604 may include a tread including at least one outer tire rib 630, and at least one outer tire groove 632. Alternatively, outer tire 604 may include any of a variety of desired tread patterns for any of a variety of applications.

Outer tire 604 may include at least one radially inwardly extending periphery engagement portion 633. Periphery engagement portion 633 may be configured to mate with axial engagement portion 624. In one embodiment, inner tire 602 includes an axial engagement portion 624 on each side of inner tire 602, and outer tire 604 includes a periphery engagement portion 633 on each side of outer tire 604, and corresponding axial engagement portions 624 and periphery engagement portions 633 mate. The mating of axial engagement portion 624 and periphery engagement portion 633 may at least substantially prevent axial movement of outer tire 604 relative to inner tire 602 during operation of tire assembly 600.

At least one of periphery engagement portion 633 and axial engagement portion 624 may include a flange configured to at least partially prevent moisture, debris, or contaminants from entering interface 606.

Outer tire 604 may include at least one outer tire bead 634. Outer tire 604 may include a plurality of outer tire beads 634. Outer tire beads 634 may be substantially circumferentially extending beads. In one embodiment, outer tire beads 634 are configured to circumferentially fix outer tire 604 to inner tire 602 during operation of tire assembly 600. Outer tire beads 634 may be oriented at any of a variety of positions within outer tire 604, including for example in at least one periphery engagement portion 633, as well in positions axially aligned with at least one substantially circumferential inner tire groove 622. In one embodiment, outer tire beads 634 extend radially inward from outer tire 604 as a positive geometry and are configured to extend into at least one substantially circumferential inner tire groove 622.

In one embodiment, interface 606 may include a system of positive and negative geometry elements in at least one of the engagement of axial engagement portion 624 to periphery engagement portion 633, and outer tire bead 634 to inner tire groove 622. Interface 606 may include a system of positive and negative geometry elements circumferentially extending about at least a portion of tire assembly 600.

Outer tire beads 634 may include any of a variety of materials, including for example: a metal such as steel, an alloy, a textile, a cord, a cord bundle, a polymer, a composite material, or the like. Outer tire beads 634 may include an aramid material. Outer tire beads 634 may include a nylon material. Outer tire beads 634 may include a polyester material. Outer tire beads 634 may include a non-metallic material.

In one embodiment, at least one outer tire groove 632 is axially offset from at least one inner tire groove.

In one embodiment, each of outer tire beads 634 are oriented along an arc having a radius R. In another embodiment, each of outer tire beads 634 are aligned and oriented at the same radius of tire assembly 600, wherein the radius is measured from the center of tire assembly 600. Stated differently, each of outer tire beads 634 may include substantially the same diameter, and each of the outer tire beads 634 may be substantially concentric.

Outer tire 600 may include at least one body ply 636. Body ply 636 may turn up about the axially outermost outer tire beads 634. Body ply 636 may extend radially inwardly about each of the remaining tire beads 634. Body ply 636 may include any of a variety of materials, including for example: a fabric or textile, a polymer, a metal such as steel, or the like. In one embodiment, body ply 636 includes aramid. Body ply 636 may include a non-metallic material.

Outer tire 600 may include at least one belt 638. At least one belt 638 may be oriented radially outward of body ply 636. Belt 638 may include any of a variety of materials, including for example: a fabric or textile, a polymer, a metal such as steel, or the like. In one example, belt 638 includes aramid. Belt 638 may include a non-metallic material. Belt 638 may include a similar hoop stiffness as a belt (not shown) in inner tire 602. Belt 638 may be configured to cause outer tire 604 to have a similar hoop stiffness as in inner tire 602. Belt 638 may include a reduced out of plane bending stiffness as compared to a belt (not shown) in inner tire 602. Belt 638 may be configured to cause outer tire 604 to have a reduced out of plane bending stiffness as compared to inner tire 602.

Tire assembly 600 may include a sensor 639. Sensor 639 may be oriented in any of a variety of positions within tire assembly 600, including at interface 606 between inner tire 602 and outer tire 604. Sensor 639 may be configured to identify a wear-through event, so as to notify a vehicle operator, technician, or the like that outer tire 604 has failed or worn to the point that it must be replaced. Sensor 639 may include a wired sensor. Sensor 639 may include a wireless sensor.

Figure 7:
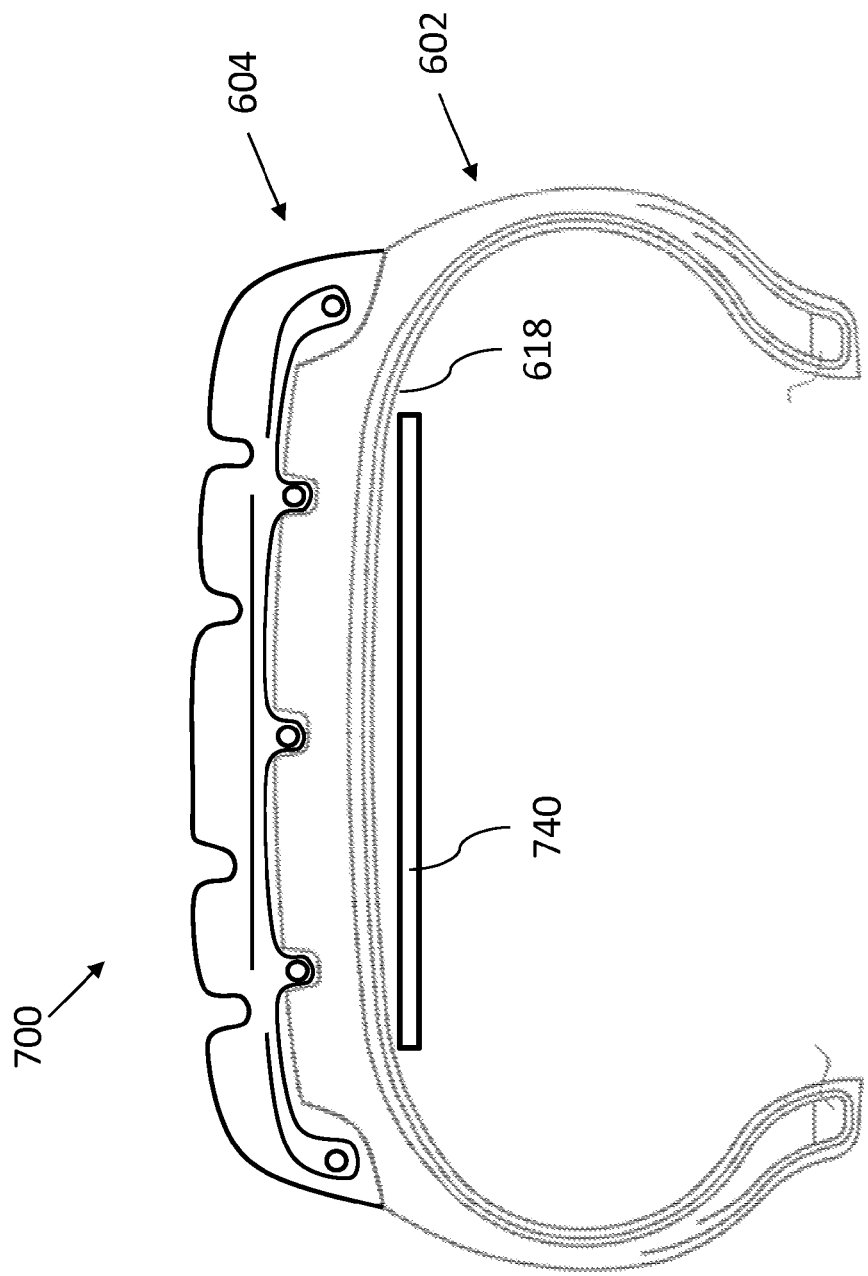
FIG. 7 illustrates a sectional view of an example embodiment of a tire assembly including an inner tire and an outer tire, and also including a support ring.

FIG. 7 illustrates a sectional view of a tire assembly 700 including inner tire 602 and outer tire 604 of FIG. 6. Tire assembly 700 may include a radially innermost surface 618. Tire assembly 700 may additionally include a support ring 740. Support ring 740 may extend at least partially in the circumferential direction, radially inwardly of innermost surface 618. Support ring 740 may extend circumferentially about the interior of tire assembly 700, and may at least partially contact innermost surface 618. Support ring 740 may extend axially along at least a portion of the width of inner tire 602. Support ring 740 may be contoured to at least partially conform to the cross-sectional shape of innermost surface 618.

Support ring 740 may include any of a variety of materials, including for example: a metal such as steel, an alloy, a polymer, a composite, or the like. Support ring 740 may be configured to keep inner tire 602 at least partially radially engaged with outer tire 604. Support ring 740 may be configured to at least partially maintain radial engagement between inner tire 602 and outer tire 604 in the event that inner tire 602 experiences a rapid air loss. Support ring 740 may be configured to at least partially, or completely, bear the weight of the vehicle that would normally be borne by inner tire 602 during operation.

Support ring 740 may include any of a variety of possible designs, including a selectively expanding ring. In practice, one may at least partially mount inner tire 602 on a vehicle rim, place outer tire 604 over inner tire 602, expand support ring 740, fully mount inner tire 602 on the vehicle rim, and pressurize inner tire 602 to a desired air pressure.

Support ring 740 may include a mechanism configured to selectively increase the circumference of support ring 740, thus selectively increasing the diameter of support ring 740.

Figure 8:
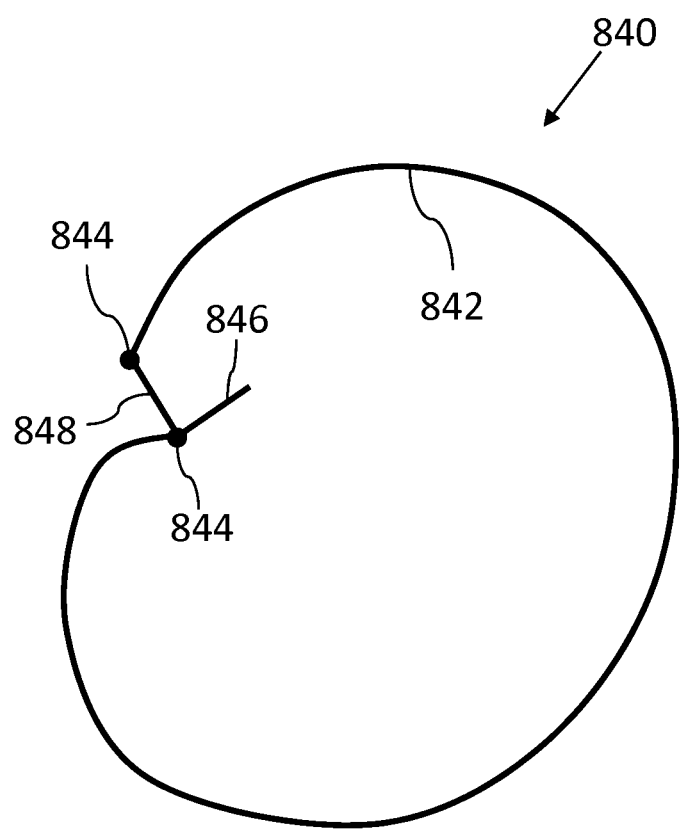
FIG. 8 illustrates a side elevational view of an example embodiment of a support ring that may be used with a tire assembly including an inner tire and an outer tire.

FIG. 8 illustrates a side elevational view of a support ring 840 that may be used with a tire assembly including an inner tire and an outer tire. Support ring 840 may include a substantially ring-shaped body 842, at least one hinge 844, a lever 846, and a linkage 848. In one embodiment, support ring 840 is installed in a collapsed position, as illustrated in FIG. 8, so as to reduce its outer diameter. Lever 846 may be rotated, causing linkage 848 to substantially align with body 842, thus increasing the circumference, and diameter, of support ring 840. As illustrated in FIG. 8, rotation of lever 846 in a clockwise direction would cause support ring 840 to increase in diameter, while rotation of lever 846 in a counterclockwise direction would cause support ring 840 to decrease in diameter.

Figure 9:
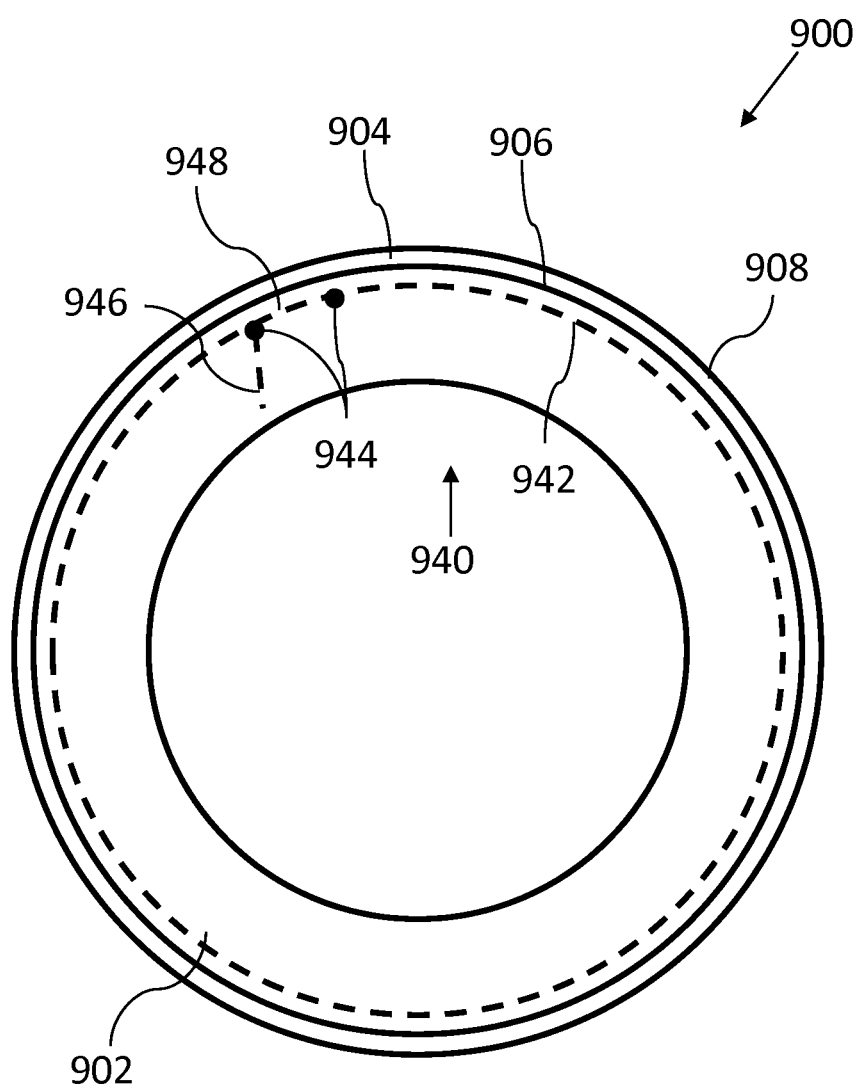
FIG. 9 illustrates a side elevational view of an example embodiment of a tire assembly including an inner tire and an outer tire, and also including a support ring.

FIG. 9 illustrates a side elevational view of a tire assembly 900 including an inner tire 902 and an outer tire 904, and also including a support ring 940.

Tire assembly 900 may include an interface 906 between inner tire 902 and outer tire 904. Tire assembly 900 may include an outer running surface 908. Tire assembly 900 may include a rim mounting portion 912.

Support ring 940 may include a substantially ring-shaped body 942, at least one hinge 944, a lever 946, and a linkage 948.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. An outer tire for use in a tire assembly, comprising:
an outer tire having:
a radially innermost surface;
an array of circumferentially and radially inwardly extending protruding portions protruding from the innermost surface, each of the protruding portions containing a circumferentially extending outer tire bead; and
a circumferentially extending body ply reaching axially across the outer tire in an undulating configuration reaching into and out of each protruding portion and reaching under each of the outer tire beads in the protruding portions.

2. The outer tire of claim 1, further comprising an inner tire having a radially outermost surface having an array of circumferential ribs separated by circumferential inner tire grooves.

3. The outer tire of claim 2, wherein the radially innermost surface of the outer tire overlays the radially outermost surface of the inner tire.

4. The outer tire of claim 2, wherein the radially inwardly extending protruding portions are fitted within the inner tire grooves.

5. The outer tire of claim 1, further comprising a circumferentially extending support ring, wherein the support ring contacts a radially innermost surface of the inner tire.

6. The outer tire of claim 5, wherein the support ring extends axially along a portion of the width of the inner tire.

7. The outer tire of claim 5, wherein the support ring includes a mechanism configured to selectively increase or decrease the diameter of the support ring.

8. The outer tire of claim 7, wherein the mechanism includes a hinge, a lever, and a linkage.

9. The outer tire of claim 1, further comprising a sensor configured to identify tire failure or tire wear to the point that the tire must be replaced.

10. A tire assembly, comprising:
an inner tire having:
a radially outermost surface having an array of circumferential ribs separated by circumferential inner tire grooves; and
an outer tire having:
a radially innermost surface overlaying the radially outermost surface of the inner tire;
an array of circumferentially and radially inwardly extending protruding portions, wherein each protruding portion contains a circumferentially extending outer tire bead; and
a circumferentially extending body ply reaching axially across the outer tire in an undulating configuration reaching into and out of each protruding portion and reaching under each of the outer tire beads in the protruding portions;
wherein the inner tire or the outer tire includes a belt.

11. The tire assembly of claim 10, wherein the array of circumferentially and radially inwardly extending protruding portions is fitted within the inner tire grooves.

12. The tire assembly of claim 10, wherein the radially innermost surface of the outer tire has two axially opposed and circumferentially extending periphery engagement portions curving radially inwardly and extending axially outwardly.

13. The tire assembly of claim 10, wherein the radially outermost surface of the inner tire includes two axially opposed and circumferentially extending axial engagement portions that recess into the inner tire, wherein the axial engagement portions mate with the periphery engagement portions of the outer tire such that the outer tire is fitted to the inner tire and the outer tire does not move axially related to the inner tire.

14. The tire assembly of claim 10, further comprising a circumferentially extending support ring, wherein the support ring contacts a radially innermost surface of the inner tire.

15. The tire assembly of claim 14, wherein the support ring extends axially along a portion of the width of the inner tire.

16. The tire assembly of claim 14, wherein the support ring includes a mechanism configured to selectively increase or decrease the diameter of the support ring.

17. The tire assembly of claim 16, wherein the mechanism includes a hinge, a lever, and a linkage.

18. The tire assembly of claim 10, further comprising a sensor configured to identify tire failure or tire replacement.

* * * * *